United States Patent [19]

Leung

[11] Patent Number: 4,466,551
[45] Date of Patent: Aug. 21, 1984

[54] CLOSURE DEVICE

[76] Inventor: Kam F. Leung, P.O. Box 127, Little Elm, Tex. 75068

[21] Appl. No.: 470,308

[22] Filed: Feb. 28, 1983

[51] Int. Cl.³ ............................................ B65D 87/06
[52] U.S. Cl. ..................................... 220/293; 285/33
[58] Field of Search ................. 220/293, 297, 300; 285/24, 33

[56] References Cited

U.S. PATENT DOCUMENTS 2,841,308  7/1958  Weicker ............................ 220/293
2,916,143 12/1959  McConalogue .................. 285/33 X
3,804,288  4/1974  Piegza ............................. 220/293 X

FOREIGN PATENT DOCUMENTS 844648  8/1960  United Kingdom ................ 220/293
967107  8/1964  United Kingdom ................ 220/293

Primary Examiner—Steven M. Pollard
Attorney, Agent, or Firm—Gerald G. Crutsinger; John F. Booth; Monty L. Ross

[57] ABSTRACT

A releasable closure device adapted to provide sealing engagement between abutting surfaces by means of a rotatable locking ring comprising a plurality of locking lugs adapted to frictionally engage recessed locking channels disposed in said surfaces.

24 Claims, 5 Drawing Figures

CLOSURE DEVICE

TECHNICAL FIELD

This invention relates to a closure device that is adapted to bring two opposed surfaces into abutting relationship with each other in such manner that they can be quickly engaged or released. One aspect of the invention relates to quick-opening closures that are useful, for example, as covers for access ports to pressure vessels. A further aspect of the invention relates to flange couplings that are adapted to provide tight locking engagement between abutting objects in such manner that the coupling can be quickly engaged or released. Yet another aspect of the invention relates to quick opening closures that are further adapted so as to prevent them from being released by unauthorized users.

BACKGROUND OF THE INVENTION

There has long existed a need for effective closure devices that are suitable for use as doors, hatches, manways, access ports or covers, especially where the intended use may subject the closure to high pressures or vacuums. Such closures are employed, for example, in autoclaves, pressure vessels, chemical reactors, pulp extractors, submarine hatches, bank vaults and space vehicles or simulators. There has also existed a need for effective closure means that are suitable for use in coupling opposed abutting surfaces such as might be found with flanged pipe sections, wheels and mounting hubs and the like.

In the past, closure devices suitable for use in these and other related applications have sometimes utilized a plurality of evenly spaced lug bolts around the perimeter of the closure to provide tight sealing engagement. However, such closures suffer from the disadvantage that considerable time and effort are required to tighten and loosen each bolt each time that the closure is engaged or disengaged. Moreover, where there are a plurality of bolts or nuts that must be individually tightened when engaging a closure, care must be taken to gradually tighten those in alternate positions around the perimeter of the closure so that the forces are evenly distributed against the gasket or other surfaces that are being brought into abutting relationship with each other. Where the individual locking bolts are not tightened in an appropriate manner, hazardous leakage or other failure of the closure may result. Also, because of the numerous individual parts that are required to effect the closure, some parts are likely to become lost or misplaced when using such conventional apparatus.

In order to reduce the time and effort required to effect such closures, bayonet type locking devices have been developed for use in some applications. With a bayonet type closure, the surfaces or objects to be coupled are provided with locking lugs that are stabbed together and then rotated relative to each other to provide locking engagement. Bayonet closures have been widely used, for example, as locking mechanisms for camera lenses. However, for larger objects or objects having considerable mass, bayonet type closures are undesirable because of the force that must be applied to rotate one object relative to the other. Moreover, in some applications it is undesirable or impossible to rotate the objects that are to be coupled relative to each other.

Many other types and configurations of closure devices have also been disclosed in the prior art. Such devices are disclosed, for example, in U.S. Pat. Nos. 1,233,171; 1,484,216; 2,283,974; 2,553,220; 2,862,728; 3,923,407; 4,183,189; and 4,320,911.

U.S. Pat. No. 1,233,171 discloses an apparatus for coupling flanges wherein beveled or wedge-shaped lug members from one flange are inserted through slots in the opposing flange. Threaded bolts are utilized to force the beveled surface of the lug against the bearing surface of the slotted flange, thereby bringing the opposing flanges into closer contact with each other. The use of packing as a sealing means between opposing flanges is also disclosed.

U.S. Pat. No. 1,484,216 discloses a flanged pipe or hose connection wherein clamping jaws are caused to bring opposing flanges into contacting relation by tightening an external clamping ring or nut that threadedly engages the periphery of one of the flanges.

U.S. Pat. No. 2,283,974 discloses a coupling for flange members wherein opposing wedge-shaped surfaces are driven into frictional engagement by a tangentially applied force that is directed through the head of a threaded bolt.

U.S. Pat. No. 2,553,220 discloses a detachable coupling means for use in mounting aircraft engine accessories. The apparatus disclosed therein utilizes a ring-like element disposed in an annular groove for increasing frictional engagement between circumferentially spaced, axially projecting, wedge-like teeth. In different embodiments, the ring-like element is either expanded or contracted by a threaded bolt or similar apparatus.

U.S. Pat. No. 2,862,728 discloses a connector for coupling a waveguide section. The disclosed apparatus utilizes a series of pivoted dogs arranged to be carried by a choke at the end of the waveguide section, and a rotatable collar operable to clamp the dogs against the back of the flange on the mating waveguide section to force the flange and the choke tightly together.

U.S. Pat. No. 3,923,407 discloses a mechanism for connecting and disconnecting crane sections. A motor-driven pinion engages with teeth on the outer periphery of a bearing race to rotate the crane. The locking mechanism comprises a ring which is received in the external groove of an annular ring member housing secured to the upper crane section. A power actuator extends between the ends of the locking ring member and can selectively expand or contract the ring. U.S. Pat. No. 4,183,189 discloses a flange connector which utilizes remotely controlled hydraulically actuated drive motors connected to a ring gear for simultaneous actuation of clamp dogs spaced about the circumference of the flange.

U.S. Pat. No. 4,320,911 discloses a penetration apparatus with a bayonet plug in a ramp-activated lock for use in spacecraft.

Notwithstanding the foregoing devices, however, there remains a need for a simple and effective closure device that is adapted to provide excellent and evenly distributed sealing engagement, and which can be quickly engaged or released with relatively little effort. A closure device is also needed that can achieve these desirable results without requiring rotation of either of the parts to be coupled.

SUMMARY OF THE INVENTION

According to the present invention, a releasable closure device is provided that is adapted to couple opposing parts, bodies or surfaces in abutting relation to each other without leakage, even when subjected to high pressures or vacuums. According to a primary object of the invention, a releasable closure device is provided that employs a rotatable locking ring to provide sealing engagement between opposing flange members.

According to one object of the invention, a quick opening closure device is provided that comprises a locking ring which cooperates with locking grooves in opposed metal flange portions to provide releasable sealing engagement therebetween. According to a preferred embodiment of the invention, the locking ring is desirably engaged and disengaged through use of a drive bolt that further comprises a worm gear adapted to mesh with a drive gear on the locking ring.

According to another object of the invention, a quick opening flange closure is provided that comprises two opposed flanges having a locking ring disposed between them for providing sealing engagement between them. Sealing engagement between the flanges is desirably achieved with a plurality of locking lugs that are disposed around the perimeter of the locking ring. The locking lugs cooperate with annular locking grooves in the flanges. According to a particularly preferred embodiment of the invention, the locking lugs and locking grooves further comprise inclined locking surfaces adapted to evenly and continuously increase the locking force that is applied to the flanges by the locking ring.

According to a further object of the invention, a quick opening closure is provided that comprises hinged flange and flange cover portions adapted to be brought into sealing engagement with each other by a rotatable locking ring comprising a plurality of tapered locking lugs.

According to a further object of the invention, a releasable locking mechanism is provided that comprises a locking ring with a plurality of I-shaped locking lugs, each of which further comprises inclined locking surfaces adapted to frictionally engage cooperating inclined surfaces in the locking grooves of opposing flange members.

These and other objects and improvements of the present invention will be further explained and better understood with reference to the accompanying drawings and the detailed description set forth below.

BRIEF DESCRIPTION OF THE DRAWINGS

The apparatus of the invention is further described in relation to the accompanying drawings wherein.

Like numerals are used to designate like parts in all figures of the drawings.

DETAILED DESCRIPTION

Figure 1:
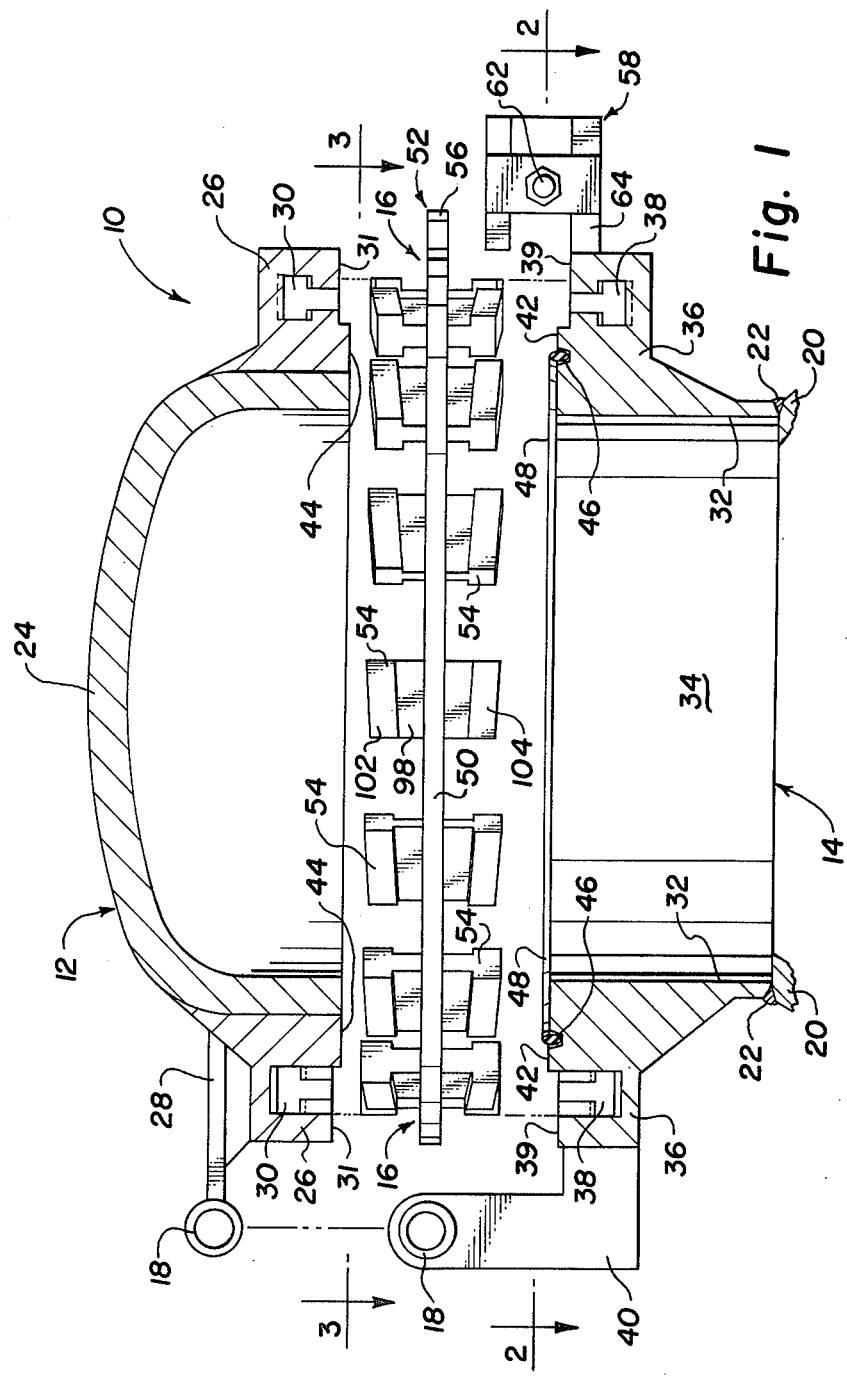
FIG. 1 depicts an exploded elevation view, partially in section, of a preferred embodiment of the apparatus of the invention.

FIG. 1 depicts a preferred embodiment of the apparatus of the invention as used with a flanged cover for a pressure vessel. Referring to FIG. 1, closure device 10 preferably comprises upper and lower closure members 12, 14, respectively, having locking ring 16 disposed therebetween. Upper closure member 12 is preferably pivotally connected to lower closure member 14 by hinge 18, although hinge 18 is exploded in FIG. 1 to better illustrate the relationship between the other parts.

According to a conventional application of closure device 10 of the invention, lower closure member 14 is preferably connected by means such as welds 22 or the like to vessel 20, which is broken away in FIG. 1. Upper closure member 12 preferably further comprises head 24 having flange cover 26 and hinge mount 28 welded thereto. Disposed within flange cover 26 is annular locking groove 30, which extends around the periphery of head 24.

As previously stated, vessel 20 can comprise, by way of example and without limitation, an autoclave, pressure vessel, heat exchanger, submarine or ship bulkhead, space vehicle, simulator, chemical reactor, pulp extractor, or the like. Similar configurations are also useful for providing releasable closures for filters, scrubbers, strainers, blowdowns, scraper and pig traps, pipe joints or the like. When closure device 10 is employed in applications where it is likely to be subjected to high pressures or vacuums, upper closure member 12 and lower closure member 14 are preferably fabricated from iron, steel, or other metals or alloys in accordance with construction codes and standards that are well known to those of ordinary skill in the art. For other uses, all or a portion of closure device 10 may be constructed from a thermoplastic or thermosetting polymeric resin, or some other material that is effective for the intended use. Thus, for example, high density polyethylene or polyvinyl chloride might be used for coupling the flanges of similarly constructed gas or water pipe. In some applications, fiber reinforced resins may also be useful.

As shown in FIG. 1, lower closure member 14 comprises cylindrical interior wall 32, which defines entryway 34 to vessel 20. Cylindrical wall 32 is encompassed by flange 36, which further comprises annular lower locking groove 38. Hinge 18 is preferably connected to flange 36 by lower hinge mount 40. Flange 36 further comprises upper surface 42 that is brought into facing engagement with lower surface 44 of upper closure member 12 when upper closure member 12 and lower closure member 14 are locked together by locking ring 16. According to a preferred embodiment of the invention, upper surface 42 of flange 36 is further adapted by means of annular sealing groove 46 to receive sealing ring 48. Sealing ring 48 desirably extends above upper surface 42 of flange 36 so as to provide sealing engagement with lower surface 44 of upper closure member 12 when upper and lower closure members 12, 14 are brought into abutting relationship and locking ring 16 is engaged. Sealing ring 48 can comprise any deformable material that is conventionally employed in such applications, although the material will preferably be resistant to degradation by fluids with which it might come into contact during use.

Locking ring 16 further comprises locking lug support ring 50, locking ring drive gear 52, and a plurality of locking lugs 54. When upper and lower closure members 12, 14, respectively are brought into abutting relation, teeth 56 on locking ring gear drive 52 are adapted to mesh with locking mechanism 58, which is preferably connected to flange 36 at a point diametrically opposed to hinge 18.

Figure 3:
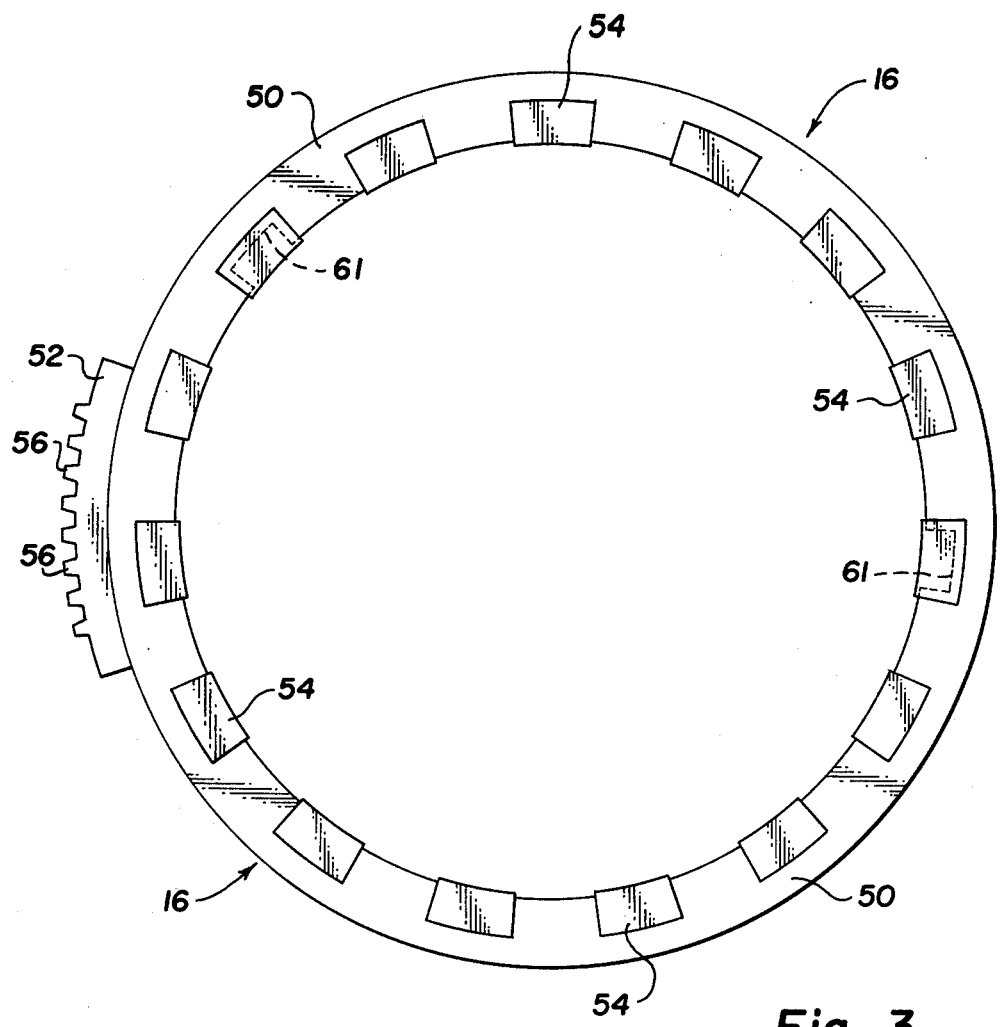
FIG. 3 is a plan view of the locking ring of the subject apparatus taken along line 3—3 of FIG. 1.

FIG. 3 depicts a plan view of locking ring 16 wherein locking lug support ring 50, locking ring drive gear 52, locking lugs 54 and gear teeth 56 are further illustrated. When closure device 10 is intended for use in high pressure or vacuum applications, locking ring 16 and its substituent parts are desirably constructed of a metal or metal alloy designed to withstand the temperatures, pressures and other operating conditions involved.

Locking ring drive gear 52 can be cast as a part of locking lug support ring 50, or can be separately manufactured and then connected to locking lug support ring 50 by any suitable means such as welding, or the like. Locking lugs 54 can be separately manufactured and installed, or can be cast together with locking lug support ring 50 as an integral part of locking ring 16. According to a preferred embodiment of the invention, locking lug support ring 50 further comprises a plurality of spaced apart notches 61 which are disposed around the inner periphery of locking lug support ring 50 to receive and maintain lugs 54 in a fixed position relative to locking lug support ring 50 as locking lug support ring 50 is rotated in a circumferential direction by locking mechanism 58.

Figure 4:
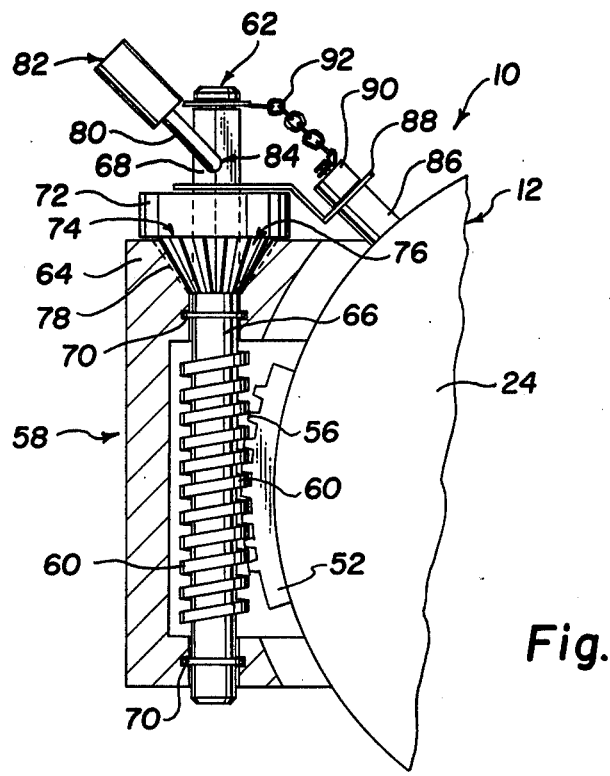
FIG. 4 is a detail view depicting a preferred releasable locking mechanism for use in the subject closure device.

Locking mechanism 58 is further described in relation to FIG. 4. FIG. 4 is a plan view depicting locking mechanism 58 partially in section so as to better describe its function in relation to the remainder of closure device 10. As shown in FIG. 4, upper closure member 12, lower closure member 14 and locking ring 16 are in the fully engaged and locked position. Locking ring gear drive 52 is the only portion of locking ring 16 that is visible when upper closure member 12 is viewed from above head 24, which is partially broken away. Teeth 56 of locking ring drive gear 52 preferably engage worm gear 60 of rotatable drive bolt 62.

Rotatable drive bolt 62 preferably comprises a cylindrical shaft portion 66 and a hexagonal shaft portion 68. Cylindrical shaft portion 66 is rotatably mounted in locking mechanism support member 64 by means of bearings 70, retaining rings, or other similarly effective means. Locking mechanism 58 further comprises locking gear knob 72. Locking gear knob 72 preferably comprises a hexagonal, centrally disposed axial bore that is adapted to slidably engage hexagonal shaft portion 68 of drive bolt 62 without permitting any appreciable rotational slippage therebetween. Locking gear knob 72 preferably further comprises beveled male gear 74 that is adapted to slidably engage beveled female gear 76 disposed in counterbore 78 of locking mechanism support member 64. When locking gear knob 72 is slidably advanced toward locking mechanism support member 64, causing beveled male gear 74 to engage beveled female gear 76, any relative rotational movement between drive bolt 62 and locking mechanism support member 64 is effectively prevented. When shackle 80 of padlock 82 is thereafter inserted through bore 84 in hexagonal shaft portion 68 of drive bolt 62, locking gear knob 72 is prevented from sliding backward, or away from locking mechanism support member 64. As long as beveled male gear 74 and beveled female gear 76 are in mating engagement, pressure exerted by locking ring drive gear 52 on worm gear 60 of cylindrical shaft portion 66 will not cause cylindrical shaft portion 66 to rotate. Where means such as shackle 80 of padlock 82 are not employed to prevent locking gear knob 72 from disengaging with locking mechanism support member 64, worm gear 60 could rotate, permitting locking ring drive gear 52 to loosen lugs 54, which can in turn lead to undesirable leakage.

Although locking mechanism 58 is disclosed herein as a preferred locking mechanism for use with the present invention, it will be appreciated that other drive mechanisms can be substituted for the drive bolt and worm gear of FIG. 4 within the scope of the invention. Thus, for example, pneumatic or hydraulic cylinders, or an electric motor drive can be utilized to rotate locking ring 16 within the scope of the invention. Similarly, it is understood that the locking mechanism utilized in the invention can be manually or automatically actuated from either a proximal or remote location.

Also shown in FIG. 4 are pressure relief valve 86, safety guard 88, safety guard retainer cap 90 and retainer cap anchor chain 92. Pressure relief valve 86 is not shown in FIG. 1, but permits the operator to vent excessive pressure from the interior of vessel 20 prior to opening closure device 10. Safety guard 88 is connected by safety guard retainer cap 90 to pressure relief valve 86, and when properly installed, preferably extends around hexagonal shaft portion 68 of drive bolt 62 to prevent the operator from accidentally disengaging locking gear knob 72 from locking mechanism support member 64 prior to venting excess pressure from the interior of the vessel. Retainer cap anchor chain 92 is preferably provided to prevent safety guard retainer cap 90 from becoming lost or misplaced when it is detached from pressure relief valve 86. Safety guard retainer cap 90 and pressure relief valve 86 are preferably adapted to be threadedly engaged.

Figure 2:
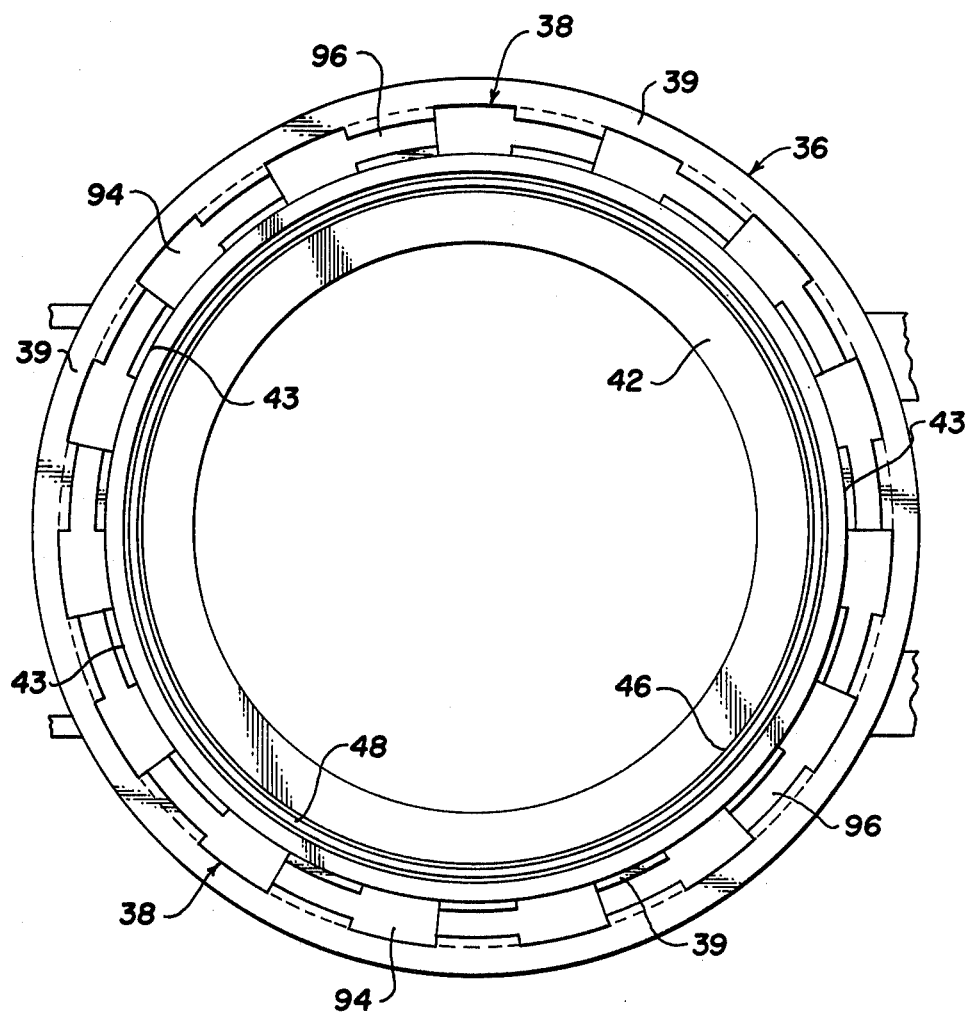
FIG. 2 depicts a plan view, partially broken away, of the subject apparatus, taken along line 2—2 of FIG. 1.

The manner in which closure device 10 of the invention operates to quickly engage or disengage upper closure member 12 from lower closure member 14 is further described and explained in relation to FIGS. 1-5. Referring to FIG. 2, lower locking groove 38 further comprises a plurality of receiving channels 94 that are preferably circumferentially spaced in alternating relation with a plurality of locking channels 96. The top of lower locking groove 38 is coplanar with locking face 39 of flange 36, and is separated by shoulder 43 from upper surface 42 of flange 36. Recessing locking face 39 below the level of upper surface 42 permits upper surface 42 of lower closure member 14 and lower surface 44 of upper closure member 12 to be brought into facing engagement by locking ring 16. Thus, the clearance between locking face 39 of lower flange 36 and locking face 31 of flange cover 26 is preferably slightly greater than the thickness of locking lug support ring 50 so that locking lug support ring 50 can rest in the annular space between locking faces 31, 39 that lies radially outward from shoulder 43 when locking lugs 54 are fully engaged and upper surface 42 is in contacting relation with lower surface 44.

As can be seen in FIG. 1, upper locking groove 30 of flange cover 26 also comprises a plurality of alternating receiving and locking channels such as those previously described in relation to lower locking groove 38. In order for locking ring 16 to function properly, it is desirable that each receiving channel 94 of lower locking groove 38 be in substantial vertical alignment with a corresponding receiving channel in upper locking groove 30, and that each locking channel 96 of lower locking groove 38 be in substantial vertical alignment with a corresponding locking channel in upper locking groove 30 when closure device 10 is in use.

Figure 5:
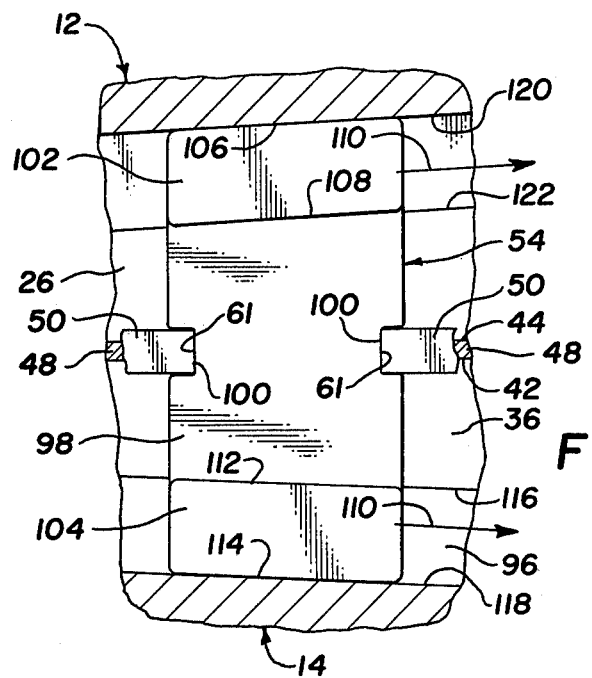
FIG. 5 is a detail view, partially in section, depicting the cooperating relationship between a locking lug and the locking grooves of the apparatus as shown in FIG. 1.

According to a preferred embodiment of the invention, locking lugs 54 are set into notches 61 of locking lug support ring 50 as shown in FIGS. 1, 3 and 5. Once locking lugs 54 are in place, locking lug support ring 50 is disposed over locking face 39 in such manner that locking ring drive gear 52 is diametrically opposed to hinge 18 and in such manner that each of lugs 54 is vertically aligned above a receiving channel 94 in lower locking groove 38. Locking lug support ring 50 is then lowered into contact with locking face 39. Once locking ring 16 is in place in lower closure member 14, upper closure member 12 is pivoted around hinge 18 so that the receiving channels in upper locking groove 30 are lowered onto the upward extending portions of lugs 54. Drive bolt 62 is then rotated, causing worm gear 60 to advance against teeth 56 of locking ring drive gear 52. As drive bolt 62 rotates, lugs 54 of locking ring 16 are advanced from receiving channels 94 into locking channels 96 of lower locking groove 38 and upper locking groove 30. The manner in which locking lugs 54 cooperate with locking grooves 30, 38 is further described in relation to FIG. 5.

Referring to FIG. 5, each locking lug 54 comprises a vertical portion 98 having notches 100 which correspond to notches 61 in locking lug support ring 50. Each lug 54 further comprises upper and lower transverse locking portions 102, 104, respectively. According to a preferred embodiment of the invention, upper and lower surfaces 106, 108 of upper transverse locking portion 102 are desirably parallel and upwardly inclined in the direction of travel as noted by arrows 110 at an angle of about 3° from the horizontal. Upper and lower surfaces 112, 114 of lower transverse locking portion 104 are preferably downward inclined in the direction of travel as noted by arrows 110 at an angle of about 3° from the horizontal. To promote frictional contact between upper and lower surfaces 112, 114 of lower transverse locking portion 104 and top and bottom surfaces 116, 118, respectively, of locking channel 96, upper and lower surfaces 116, 118 are also desirably downward inclined in the direction indicated by arrow 110 at an angle of about 3° from the horizontal. Upper and lower surfaces 120, 122, respectively, of the upper locking channels are preferably upwardly inclined in a similar manner as shown in FIG. 5. Thus, as locking lug support ring 50 and locking lugs 54 are advanced from receiving channels 94 into locking channels 96, upper closure member 12 and lower closure member 14 are drawn tightly together until upper surface 42 of flange 36 and lower surface 44 of flange cover 26 are separated, if at all, only by the thickness of compressed sealing ring 48.

Closure device 10 can later be reopened when desired by venting any excess pressure through pressure relief valve 86, removing padlock 82 (where employed), sliding locking gear knob 72 outwardly from locking mechanism support member 64 so as to disengage beveled male gear 74 from beveled female gear 76, and rotating drive bolt 62 and worm gear 60 in the reverse direction, thereby backing locking lug 54 out of locking channels 96 into receiving channels 94.

Through use of the apparatus and method described herein, it is now possible to quickly and effectively lock and unlock flange couplings in a manner that has not previously been available to those of ordinary skill in the art. While the invention is described herein in relation to a preferred embodiment for use as a closure device for pressure vessels, it is understood that the closure apparatus disclosed herein is similarly useful for coupling other surfaces, parts, objects or bodies in an abutting relationship, whether or not such objects or bodies are pivotally connected. Thus, for example, it is possible within the scope of the present invention to couple abutting sections of conventional, commercially available pipe by providing lap joint stub ends of such sections with lap joint flanges having annular locking grooves disposed therein. Other alterations and modifications of the present invention will also become apparent to such persons upon reading the present disclosure in connection with the accompanying drawings, and it is intended to cover all such modifications as fall within the scope of the appended claims.

What is claimed is:

1. A closure device comprising two opposed surfaces adapted to be brought into abutting relation to each other, each surface further comprising a locking groove; a locking ring disposed between said surfaces, said locking ring further comprising a plurality of circumferentially spaced locking lugs, said locking lugs being adapted to provide frictional engagement with said locking grooves when said locking ring is rotated, thereby bringing said surfaces into abutting relation to each other; and means for rotating said locking ring and said locking lugs relative to said locking grooves to provide said frictional engagement.

2. The apparatus of claim 1 wherein said locking lugs are adapted by means of inclined surfaces to provide frictional engagement with said locking grooves.

3. The apparatus of claim 1 wherein said locking groove further comprises a plurality of receiving channels and a plurality of locking channels, said receiving channels being circumferentially spaced in alternating relation with said locking channels.

4. The apparatus of claim 3 wherein the receiving channels in the locking grooves of said opposed surfaces are circumferentially aligned.

5. The apparatus of claim 3 wherein said locking channels further comprise at least one inclined surface adapted to provide frictional engagement with said locking lugs.

6. The apparatus of claim 1 wherein said locking ring is adapted to be rotated so as to bring said opposed surfaces into abutting relation to each other while said opposed surfaces are maintained in constant rotational alignment to each other.

7. The apparatus of claim 1 wherein said opposed surfaces are pivotally connected.

8. The apparatus of claim 1 wherein at least one of said opposed surfaces further comprises an annular sealing means.

9. The apparatus of claim 8 wherein said sealing means is disposed in an annular groove in said surface.

10. The apparatus of claim 1 wherein the portion of said surfaces comprising said locking grooves are recessed from the portion of said surfaces adapted to be brought into abutting relation to each other.

11. The apparatus of claim 1 wherein said opposed surfaces are flanges.

12. The apparatus of claim 1 wherein one of said opposed surfaces is a flange and the other is a flange cover.

13. The apparatus of claim 1 wherein said means for rotating said locking ring and said locking lugs further comprises a drive mechanism adapted to move said locking ring in a circumferential direction.

14. The apparatus of claim 13 wherein said locking ring further comprises an outwardly disposed drive gear and wherein said drive means comprises a worm gear adapted to engage said locking ring drive gear in such manner that said locking ring can be moved in a circumferential direction by rotating said worm gear.

15. The apparatus of claim 13 wherein said drive means is hydraulically actuated.

16. The apparatus of claim 13 wherein said drive means is pneumatically actuated.

17. The apparatus of claim 13 wherein said drive means is electrically actuated.

18. The apparatus of claim 13 wherein said drive means is actuated from a remote location.

19. The apparatus of claim 13, further comprising means for locking said drive means so as to prevent unintended rotation of said locking ring.

20. A releasable flange closure comprising two opposed flanges having a rotatable locking ring disposed therebetween for providing sealing engagement between them, said locking ring further comprising a plurality of circumferentially spaced locking lugs adapted to cooperate with recessed annular locking grooves disposed in said flanges.

21. The apparatus of claim 20 wherein said locking lugs and said locking grooves further comprise inclined locking surfaces adapted to evenly and continuously increase the locking force applied to said flanges by said locking ring.

22. A releasable closure device comprising hinged flange and flange cover portions adapted to be brought into sealing engagement with each other by a rotatable locking ring comprising a plurality of tapered locking lugs, said locking lugs further comprising inclined locking surfaces adapted to frictionally engage cooperating inclined surfaces in locking grooves disposed in said flange and flange cover portions.

23. The apparatus of claim 1 wherein at least a portion of said closure device is fabricated from materials selected from the group consisting of metals and metal alloys.

24. The apparatus of claim 1 wherein at least a portion of said closure device is fabricated from materials selected from group consisting of thermoplastic and thermosetting polymeric resins.

* * * * *